United States Patent
Xu et al.

(10) Patent No.: US 6,765,907 B1
(45) Date of Patent: *Jul. 20, 2004

(54) MULTICAST ECHO REMOVAL

(75) Inventors: Xi Xu, Milpitas, CA (US); Shuxian Lou, San Jose, CA (US); Shujin Zhang, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/185,989

(22) Filed: Jun. 26, 2002

Related U.S. Application Data (63) Continuation of application No. 09/268,868, filed on Mar. 16, 1999.

(51) Int. Cl.[7] .............................................. H04L 12/46
(52) U.S. Cl. ...................................... 370/390; 370/432
(58) Field of Search ................................ 370/390, 401, 370/432, 312

(56) References Cited

U.S. PATENT DOCUMENTS

| | | | |
|---|---|---|---|
| 4,131,767 A | 12/1978 | Weinstein ................ 179/170.2 |
| 5,027,350 A | * 6/1991 | Marshall |
| 5,243,596 A | 9/1993 | Port et al. .................. 370/94.1 |
| 5,303,237 A | 4/1994 | Bergman et al. ........... 370/85.6 |
| 5,305,311 A | 4/1994 | Lyles ........................... 370/60 |
| 5,473,598 A | * 12/1995 | Takatori et al. |
| 5,473,607 A | 12/1995 | Hausman et al. ........ 370/85.13 |
| 5,502,725 A | 3/1996 | Pohjakallio ................ 370/94.1 |
| 5,802,047 A | 9/1998 | Kinoshita ................... 370/359 |
| 5,852,721 A | 12/1998 | Dillon et al. ........... 395/200.47 |
| 5,898,686 A | 4/1999 | Virgile ........................ 370/381 |
| 5,964,850 A | 10/1999 | Castell et al. ................. 710/14 |
| 6,018,526 A | 1/2000 | Liu et al. .................... 370/401 |
| 6,018,770 A | 1/2000 | Little et al. ................. 709/223 |
| 6,023,724 A | 2/2000 | Bhatia et al. ............... 709/218 |
| 6,081,532 A | 6/2000 | Fiammante ................. 370/401 |
| 6,331,983 B1 | * 12/2001 | Haggerty et al. ........... 370/400 |
| 6,335,939 B1 | * 1/2002 | Hanna et al. ............... 370/501 |
| 6,424,650 B1 | * 7/2002 | Yang et al. ................. 370/390 |

* cited by examiner

*Primary Examiner*—Kenneth Vanderpuye
(74) *Attorney, Agent, or Firm*—Thelen Reid & Priest LLP; Marc S. Hanish (57) ABSTRACT

An apparatus is provided which processes upstream multicast packets and downstream multicast packets in a manner such as to avoid the problem of multicast echo which is generated from a host gateway. For upstream multicast packets, a method is provided which includes: extracting the source network address from the upstream multicast packet; storing said source network address in a table corresponding to the destination host gateway of the packet; and forwarding the upstream multicast packet to the destination network address. For downstream multicast packets, a method is provided which includes: accessing a table corresponding to the host gateway from which the packet was sent; determining if said source network address of the multicast packet is identical to an entry in said table; discarding the multicast packet if said source network address is identical to an entry in said table; and forwarding the multicast packet to said destination network address if said source network address is not identical to an entry in said table. This eliminates any downstream multicast packets which originated from one of the hosts coupled to the apparatus, and thus prevents multicast echo problems from occurring.

20 Claims, 5 Drawing Sheets

MULTICAST ECHO REMOVAL

CROSS-REFERENCE TO RELATED APPLICATION

This application is a continuation of application Ser. No. 09/268,868, entitled "Multicast Echo Removal" by Xi Xu, Shuxian Lou, and Shujin Zhang, filed on Mar. 16, 1999.

BACKGROUND OF THE INVENTION

1. Field of the Invention

The present invention relates to multicasting on a data communications network. More specifically, the present invention relates to eliminating the problem of multicast echo, where duplicates of a multicast packet are delivered to the same address.

2. The Background

Figure 1:
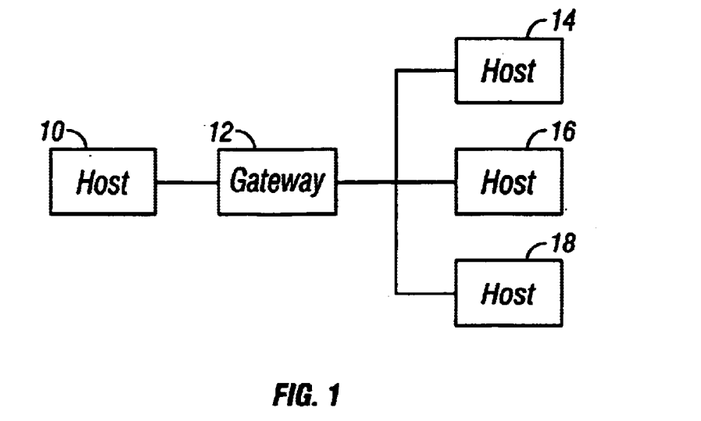
FIG. 1 is a diagram illustrating a network capable of utilizing multicasting.

Multicasting is the process by which a host or other device transmits a message or packet to a selected group of recipients. It is commonly used in broadcast networks like Ethernet networks but may be used in any type of network. FIG. 1 is a diagram illustrating a network capable of utilizing multicasting. Host 10 is coupled via an Ethernet link to a gateway 12. Additional hosts 14, 16, 18 may also be coupled to the gateway 12 via Ethernet links. Host 10 may be a member of a multicast group which also includes hosts 14, 16, and 18. Thus, if host 10 transmits a packet to gateway 12, gateway 12 will send a duplicate of the packet to the other members of the group, which include hosts 14, 16, and 18.

Figure 2:
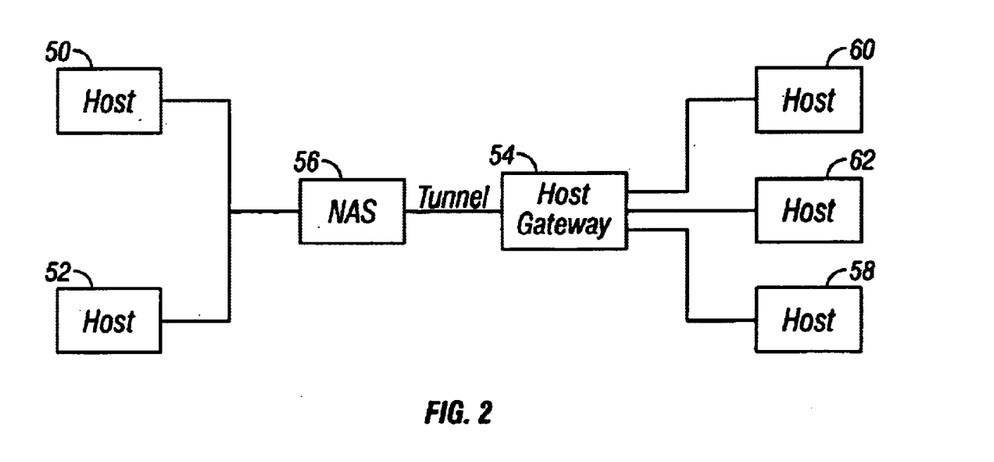
FIG. 2 is a diagram illustrating a network capable of utilizing multicasting in which multicast echo problems may occur.

There is a potential, however, in certain instances, for a multicasting echo problem to arise. A multicast echo occurs when two or more versions of the same packet arrive at the same destination or host. FIG. 2 illustrates an example of how this might occur. Host 50 and host 52 are both coupled to a network access server (NAS) 56, which may be located between the hosts 50, 52 and a host gateway 54. Host gateway 54 may also be coupled to hosts 58, 60, 62. The problem arises if both host 50 and host 52 are members of the same multicast group. Host 50 may transmit a packet intended for each member of the multicast group. Since host 52 is on the same Ethernet segment as host 50, the packet will be received by host 52 directly from host 50. However, host gateway 54 will also send a duplicate of the packet to each member of the multicast group, which includes host 52. Thus, host 52 will receive two versions of the same packet. This consumes valuable bandwidth and CPU cycles of both the gateways and the hosts.

This problem is amplified if the host gateway performs any type of routine modification on the packets, such as network address translation (NAT). NAT is a process by which a gateway modifies either the source address or destination address of a packet in order to compensate for the fact that there is a different addressing scheme on the other side of the gateway. Thus, if NAT is used in the multicast situation discussed above, it is possible for host 52 to receive two packets, identical in every way except for the fact that they have different source addresses. This has the potential to confuse or break multicast applications and confuse the end users. Thus, it is necessary to arrive at a solution which removes this potential multicast echo problem.

SUMMARY OF THE INVENTION

An apparatus is provided which processes upstream multicast packets and downstream multicast packets in a manner such as to avoid the problem of multicast echo which is generated from a host gateway. For upstream multicast packets, a method is provided which includes: extracting the source network address from the upstream multicast packet; storing said source network address in a table corresponding to the destination host gateway of the packet; and forwarding the upstream multicast packet to the destination network address. For downstream multicast packets, a method is provided which includes: accessing a table corresponding to the host gateway from which the packet was sent; determining if said source network address of the multicast packet is identical to an entry in said table; discarding the multicast packet if said source network address is identical to an entry in said table; and forwarding the multicast packet to said destination network address if said source network address is not identical to an entry in said table. This eliminates any downstream multicast packets which originated from one of the hosts coupled to the apparatus, and thus prevents multicast echo problems from occurring.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The present invention utilizes a network access server (NAS), such as may be implemented in a service selection gateway (SSG), or other device in between one or more hosts and one or more host gateways in order to filter out redundant multicast packets. A gateway is a device which performs protocol conversion between different types of networks or applications. The term gateway is not meant to be limited to a single type of device, as any device, hardware or software, that may act as a bridge between the user and the networks may be considered a gateway for purposes of this application. A NAS is a communications processor that connects asynchronous devices to a LAN or WAN, normally through network and terminal emulation software, and performs routing of supported protocols. For purposes of this application, a NAS may be implemented in either hardware or software and may be distributed among several devices rather than contained in a single device.

Figure 3:
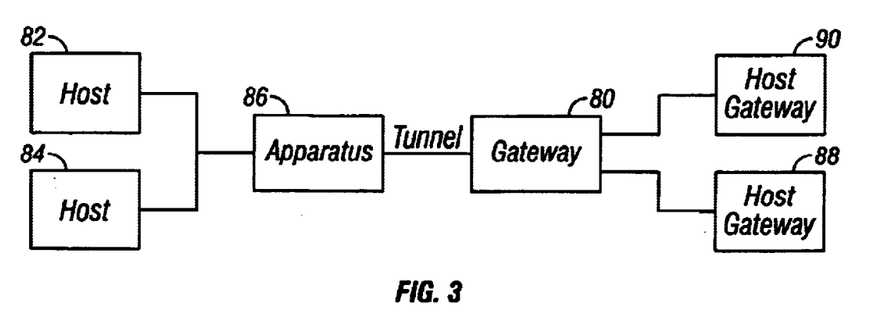
FIG. 3 is a block diagram illustrating a gateway placed in accordance with a presently preferred embodiment of the present invention.

FIG. 3 is a block diagram illustrating an apparatus in accordance with a presently preferred embodiment of the present invention in a system similar to that of FIG. 1. Gateway 80 may be coupled to one or more hosts 82, 84 using a single network link (such as Ethernet). Apparatus 86 may be placed between gateway 80 and hosts 82, 84 and may be implemented as a network access server. Gateway 80 may also be coupled to one or more host gateways 88, 90. The link between the apparatus 86 and the gateway 80 may be accomplished utilizing a tunneling protocol. Tunneling allows two hosts on the same type of network to communicate even though there may be different types of network in between. Tunneling is accomplished by encapsulating packets sent from a first type of network within packets of a type compatible with a second type of network for the duration of the packet's journey through the second type of network. Then, the outer packet encapsulation layer is stripped off (and possibly some demultiplexing takes place) when the packet reaches the first type of network again.

When a multicast packet is sent from a host 82, 84 through the apparatus 86 (an "upstream" packet), the apparatus need not filter the packet in any way. However, the apparatus will extract a source network address from the packet and store the source network address in a table. When a packet is sent from the host gateways 86, 88 through the apparatus 86 ("downstream packets"), there is a threat that these downstream packets, while being sent from host gateways 86, 88 are actually reproductions of a packet originating with one of the hosts 82, 84. These duplications were made in line with multicasting, and delivery of one of these reproduced packets to one of the hosts 82, 84 would result in a redundancy and potential multicast application failure. Thus, the source network addresses of these downstream packets are compared with the source network addresses stored in the table. If a match is found, the downstream packet originated from one of the hosts and should be discarded. Otherwise, the packet is properly forwarded to the host. These procedures are described in more detail below.

Figure 4:
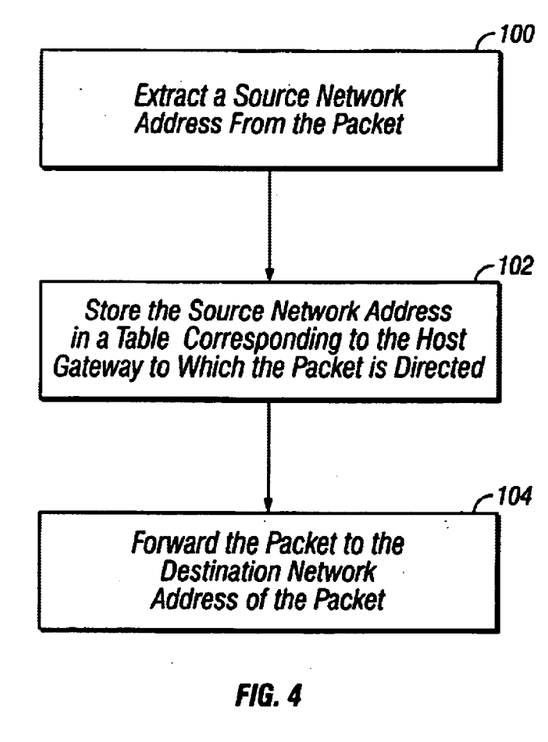
FIG. 4 is a flow diagram illustrating a method for processing an upstream multicast packet in accordance with a presently preferred embodiment of the present invention.

FIG. 4 is a flow diagram illustrating a method for processing an upstream multicast packet. This method will most likely be performed by an apparatus implemented as a network access server (NAS) or similar device or module, which may be embodied in hardware or software, and may be implemented in a service selection gateway. Each multicast packet contains a source network address, indicating the source address at which the packet originated, and a destination network address, indicating the destination of the packet. At 100, the source network address is extracted from the packet. Since this is an upstream packet, the packet originated from one of the hosts coupled to the gateway. The source network address indicates the network address of the host from which the packet originated. At 102, this address is stored in a table. The apparatus used in the present invention may maintain a table for each host gateway to which it is coupled. Each of these tables may be a hash table, with entries containing the network addresses corresponding to hosts which sent multicast packets to each host gateway.

In order to determine the proper table in which to store the source network address, the destination host gateway must be found. This may be found in a variety of different ways, depending upon the protocol used in the network. In many networks, the apparatus itself will determine to which host gateway the multicast packet is sent. In other networks, the host may make that determination, forwarding the information in the header of the packet. Other methods are also possible, and the present invention is not limited to the method disclosed.

However the destination host gateway is determined, once it is known, the apparatus simply stores the source network address in the table corresponding to the appropriate host gateway. Then, at 104, the multicast packet is forwarded to the destination network address.

If the packet is not echoed back to the apparatus, then the apparatus may proceed to function normally. However, if the packet is echoed back, there is a major concern that it may cause a superfluous copy of the packet to reach one or more of the hosts. Therefore, measures must be taken when a downstream packet is received to prevent this from occurring.

Figure 5:
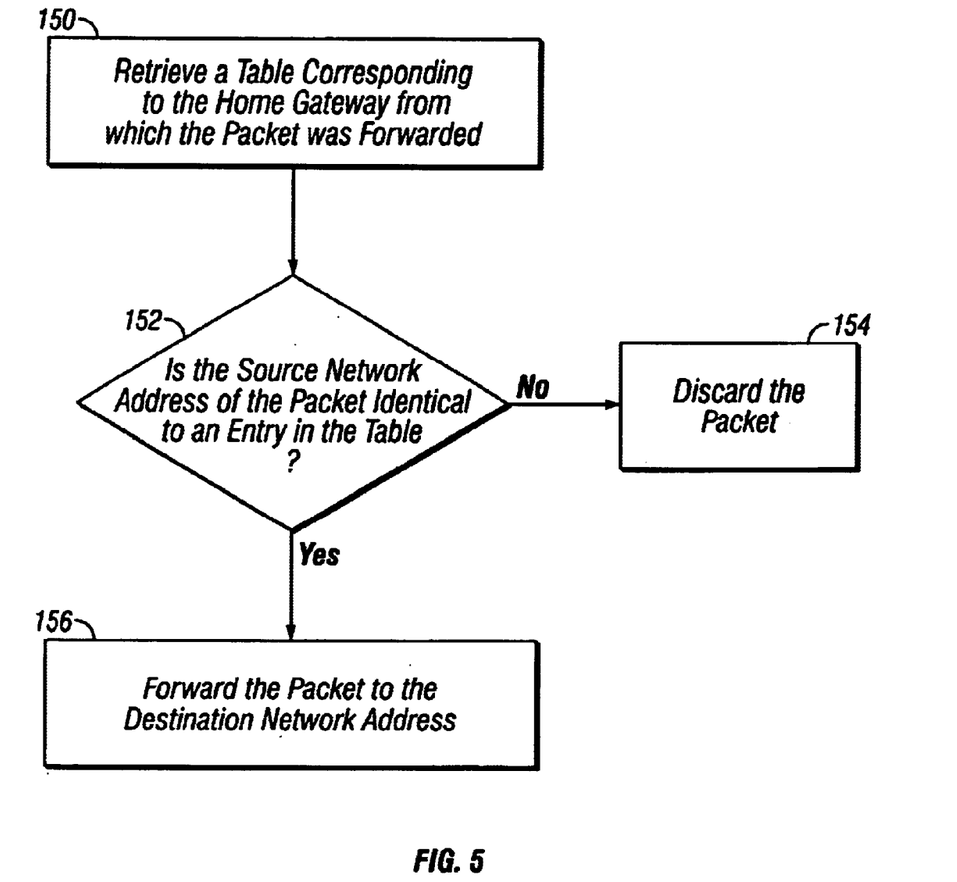
FIG. 5 is a flow diagram illustrating a method for processing a downstream multicast packet in accordance with a presently preferred embodiment of the present invention.

FIG. 5 is a flow diagram illustrating a method for processing a downstream multicast packet sent from a host gateway according to a presently preferred embodiment of the present invention. At 150, a table corresponding to the host gateway is retrieved. The proper table may be determined by taking information regarding the port on which the multicast packet arrived and using that information to determine from which host gateway it arrived. The connection between the apparatus and a gateway linked to the host gateways is likely a tunnel, thus making it much easier to determine the source host gateway of the packet.

At 152, the table may then be searched (or traversed, depending upon the type of table) in an attempt to match the source network address of the multicast packet with one of the entries in the table. If the source network address is found in the table, then the packet had its origins with one of the hosts, and thus forwarding the packet would result in a multicast echo. If this is the case, at 154, the multicast packet is discarded. If this is not the case, then at 156 the packet may be forwarded to the destination network address.

If network address translation (NAT) is being performed on the packets, the apparatus may first have to do the translation before the method or methods listed above may be performed, so that the source network addresses of the downstream packets match the source network addresses of the hosts.

Since both methods may be performed by a single apparatus, the apparatus may also require the additional step of determining whether the packet is a downstream packet or an upstream packet before choosing which of the methods to perform.

Figure 6:
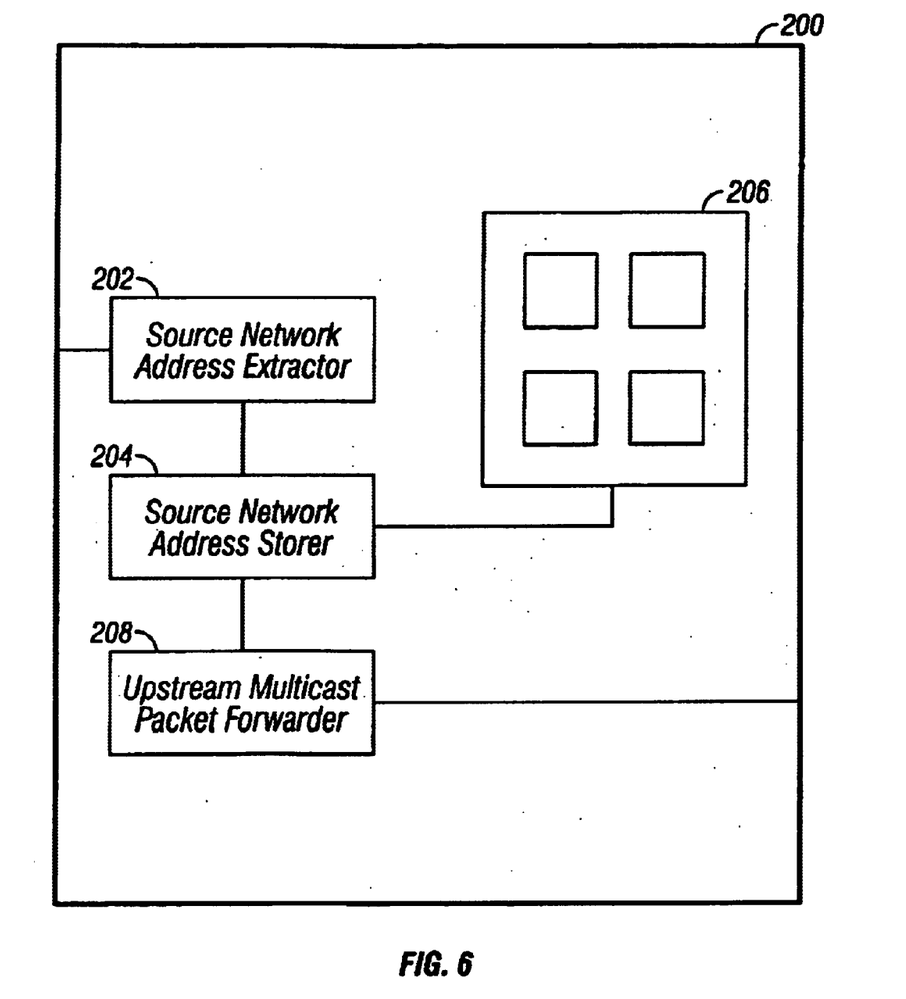
FIG. 6 is a block diagram illustrating a gateway for processing an upstream multicast packet in accordance with another embodiment of the present invention.

FIG. 6 is a block diagram illustrating an apparatus for processing an upstream multicast packet according to another embodiment of the present invention. Apparatus 200 includes a source network address extractor 202, which extracts the source network address from the packet. A source network address storer is coupled to the source network address extractor 202 and to one or more tables 206. The source network address storer 202 stores the source network address in the table corresponding to the destination host gateway of the packet. An upstream multicast packet forwarder 208 is coupled to the source network address storer and forwards the packet to the appropriate destination address.

Figure 7:
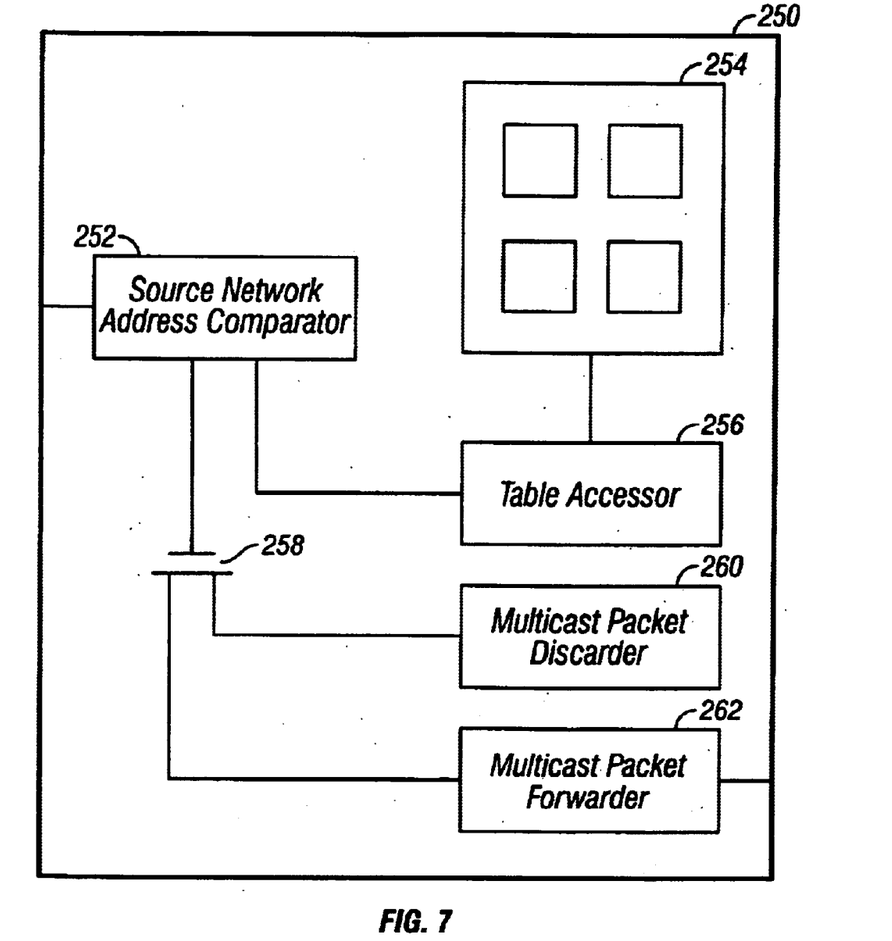
FIG. 7 is a block diagram illustrating a gateway for processing a downstream multicast packet in accordance with another embodiment of the present invention.

FIG. 7 is a block diagram illustrating an apparatus for processing a downstream multicast packet according to another embodiment of the present invention. Apparatus 250 contains a source network address comparator 252, which compares the source network address of the packet to entries found in a table corresponding to the host gateway from which the packet was sent. In order to facilitate this, a table accessor 256 is coupled to the source network address comparator, which searches through one or more tables 254 until the appropriate one is found. The table accessor 256 may be designed in many different ways based on the form of the tables. However, it may have to include an information access coupled to a host gateway determiner in order to determine the host gateway from which the packet was sent so that the appropriate table may be accessed. A multicast packet discarder 260 is coupled to the source network address comparator 252 via a switch 258 if the source network address of the packet is identical to an entry in the table. Otherwise, a multicast packet forwarder 262 is coupled to the source network address comparator 252 via switch 258. If NAT was being performed, a reverse NAT needs to be performed after it is determined that the packet must be forwarded.

The apparatuses of FIG. 6 and the gateway of FIG. 7 may be combined to function as a single apparatus. If this occurs, a multicast packet determiner may be provided which determines whether the packet is an upstream packet or a downstream packet.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for processing an upstream multicast packet, the upstream multicast packet having a source network address, a destination network address, and associated with a destination host gateway, the method comprising:
    extracting the source network address from the upstream multicast packet;
    storing said network address in a table corresponding to the destination host gateway of the upstream multicast packet; and
    forwarding the upstream multicast packet to the destination network address.

2. The method of claim 1, wherein said table is a hash table.

3. A method for processing a downstream multicast packet sent from a host gateway, the downstream multicast packet having a source network address and a destination network address, the method including:
    accessing a table corresponding to the host gateway, wherein said table includes a list of network addresses;
    determining if said source network address is identical to an entry in said table;
    discarding said multicast packet if said source network address is identical to an entry in said table; and
    forwarding the multicast packet to said destination network address if said source network address is not identical to an entry in said table.

4. The method of claim 3, wherein said table is a hash table.

5. The method of claim 3, wherein said accessing includes:
    taking information regarding the port on which the multicast packet arrived; and
    using said information to determine from which host gateway the multicast packet arrived.

6. An apparatus for processing an upstream multicast packet, the upstream multicast packet having a source network address, a destination network address, and associated with a destination host gateway, the apparatus including:
    a source network address extractor;
    one or more tables, each of said tables corresponding to a different host gateway;
    a source network address storer coupled to said source network address extractor and coupled to the one of said one or more tables corresponding to the destination host gateway; and
    an upstream multicast packet forwarder coupled to said source network address storer.

7. The apparatus of claim 6, wherein said table is a hash table.

8. An apparatus for processing a downstream multicast packet sent from a host gateway, the downstream multicast packet having a source network address and a destination network address, the apparatus including:
    a table corresponding to the host gateway, said table containing a list of network addresses;
    a table accessor coupled to said table;
    a source network address comparator coupled to said table accessor;
    a multicast packet discarder coupled to said source network address comparator if said source network address is identical to an entry in said table; and
    a multicast packet forwarder coupled to said source network address comparator if said source network address is not identical to an entry in said table.

9. The apparatus of claim 8, wherein said table is a hash table.

10. The apparatus of claim 8, wherein said table accessor includes:
    an information accessor; and
    a host gateway determiner couped to said information accessor.

11. A program storage device readable by a machine, tangibly embodying a program of instructions executable by the machine to perform method steps for processing an upstream multicast packet, the upstream multicast packet having a source network address, a destination network address, and associated with a destination host gateway, the method comprising:
    extracting the source network address from the upstream multicast packet;
    storing said network address in a table corresponding to the destination host gateway of the upstream multicast packet; and
    forwarding the upstream multicast packet to the destination network address.

12. The program storage device of claim 1, wherein said table is a hash table.

13. A program storage device readable by a machine, tangibly embodying a program of instructions executable by the machine to perform method steps for processing a downstream multicast packet sent from a host gateway, the downstream multicast packet having a source network address and a destination network address, said method including:
    accessing a table corresponding to the host gateway, wherein said table includes a list of network addresses;
    determining if said source network address is identical to an entry in said table;
    discarding said multicast packet if said source network address is identical to an entry in said table; and
    forwarding the multicast packet to said destination network address if said source network address is not identical to an entry in said table.

14. The program storage device of claim 13, wherein said table is a hash table.

15. The program storage device of claim 13, wherein said accessing includes:
taking information regarding the port on which the multicast packet arrived; and
using said information to determine from which host gateway the multicast packet arrived.

16. An apparatus for processing an upstream multicast packet, the upstream multicast packet having a source network address, a destination network address, and a destination host gateway, the apparatus comprising:
means for extracting the source network address from the upstream multicast packet;
means for storing said source network address in a table corresponding to the destination host gateway of the upstream multicast packet; and
means for forwarding the upstream multicast packet to the destination network address.

17. The apparatus of claim 16, wherein said table is a hash table.

18. An apparatus for processing a downstream multicast packet sent from a host gateway, the downstream multicast packet having a source network address and a destination network address, the apparatus including:

means for accessing a table corresponding to the host gateway, wherein said table includes a list of network addresses;
means for determining if said source network address is identical to an entry in said table;
means for discarding said multicast packet if said source network address is identical to an entry in said table; and
means for forwarding the multicast packet to said destination network address if said source network address is not identical to an entry in said table.

19. The apparatus of claim 18, wherein said table is a hash table.

20. The apparatus of claim 19, wherein said accessing includes:
means for taking information regarding the port on which the multicast packet arrived; and
means for using said information to determine from which host gateway the multicast packet arrived.

\* \* \* \* \*

UNITED STATES PATENT AND TRADEMARK OFFICE
CERTIFICATE OF CORRECTION

PATENT NO. : 6,765,907 B1 Page 1 of 1
APPLICATION NO. : 10/185989
DATED : July 20, 2004
INVENTOR(S) : Xu et al.

It is certified that error appears in the above-identified patent and that said Letters Patent is hereby corrected as shown below:

In Column 4 line 50, after "network address storer", insert --204--.

In Column 4 line 52, after "network address storer", replace "202" with --204--.

In Column 6 line 47, after "12. The program storage device of claim", replace "1" with --11--.

Signed and Sealed this

Second Day of October, 2007

JON W. DUDAS
*Director of the United States Patent and Trademark Office*